(12) United States Patent
Wang et al.

(10) Patent No.: US 8,454,218 B2
(45) Date of Patent: Jun. 4, 2013

(54) ILLUMINATING APPARATUS

(75) Inventors: Wei-Chih Wang, Hsin-Chu (TW); Udo Custodis, Hsin-Chu (TW); Wen-Chiao Chang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 367 days.

(21) Appl. No.: 12/783,575

(22) Filed: May 20, 2010

(65) Prior Publication Data
US 2011/0286240 A1     Nov. 24, 2011

(51) Int. Cl.
*F21V 7/04*     (2006.01)

(52) U.S. Cl.
USPC .............................. 362/607; 362/627; 362/628

(58) Field of Classification Search
USPC ........................ 362/607, 613, 606, 628, 627
See application file for complete search history.

(56) References Cited

U.S. PATENT DOCUMENTS

| | | | | |
|---|---|---|---|---|
| RE33,987 E | * | 7/1992 | Suzawa ............................ 349/67 |
| 5,613,751 A | * | 3/1997 | Parker et al. .................. 362/627 |
| 5,719,649 A | * | 2/1998 | Shono et al. .................... 349/65 |
| 6,356,394 B1 | | 3/2002 | Glienicke |
| 7,438,454 B2 | * | 10/2008 | Chinniah et al. ............. 362/500 |
| 2003/0128957 A1 | | 7/2003 | Kalantar |
| 2007/0171678 A1 | | 7/2007 | Shim et al. |

FOREIGN PATENT DOCUMENTS

JP     2002-329403     11/2011

OTHER PUBLICATIONS

"Office Action of Japan counterpart application" with English translation thereof, issued on Dec. 18, 2012, p1-p5, in which the listed reference was cited.

\* cited by examiner

*Primary Examiner* — Mariceli Santiago
*Assistant Examiner* — Glenn Zimmerman
(74) *Attorney, Agent, or Firm* — Jianq Chyun IP Office

(57) ABSTRACT

An illuminating apparatus includes a plurality of light source units and a light guide plate. The light guide plate has a flat part and a protruding part, wherein the light source units provide a side light beam into the light guide plate at an edge surface, the side light beam is guided in the light guide plate and exits at the protruding part.

10 Claims, 12 Drawing Sheets

ILLUMINATING APPARATUS

BACKGROUND OF THE INVENTION

1. Field of Invention

The invention relates to an illuminating technology. More particularly, the invention relates to an illuminating apparatus using a light guide plate.

2. Description of Related Art

There are so many designs of an illuminating apparatus seen in the conventional art. However, depending on the purpose of a light source being involved, the different concerns are made. For the considering a light source with large area in better uniformity of light intensity is concerned in various applications. Particularly, for the back light module used in flat image display, the light intensity is required to be uniform at a large area. However, the uniform light is rather monotone, and could not produce pleasant visual effect.

FIG. 1 is a drawing, schematically illustrating perspective view of a conventional back light module. In FIG. 1, as disclosed in U.S. Publication 2007/0171678, the back light module is formed by a light guiding unit. The light guiding unit of a direct illumination type backlight assembly guides light generated from a point light source arranged on a direct illumination portion of a display panel toward the display panel. The light guiding unit has a substantially plate shape including a recessed portion 15 that is recessed toward the point light source and a protruding portion 30 that is protruded toward the point light source. The protruded portion 30 may have substantially the same profile as the recessed portion 15. The protruded portion 30 has a light incident surface to receive the point light source, so as to convert into the plane light.

FIG. 2 is a drawing, schematically illustrating a cross-section view of a conventional illuminating apparatus. In FIG. 2, as disclosed in U.S. Publication 2003/0128957, a light guide panel 40 is used to produce a planar light in an area with uniform light intensity. The light source is incident into the light guide panel 40 from the incident surface 42 at the tubular structure 44. In other words, the light guide panel 40 uses the tubular structure 44 to convert the incident point-like light source into a planar light in large area with uniform light intensity.

FIG. 3 is a drawing, schematically illustrating a cross-section view of a conventional illuminating apparatus. In FIG. 3, as disclosed in U.S. Pat. No. 6,356,394, a mushroom-shaped light guide for a homogeneous illumination of a circular scale of a motor vehicle operating device is disclosed. A light source, for example, a light emitting diode (LED) 52 is arranged opposite a light input surface of the mushroom-shaped cone 50. The mushroom-shaped cone 50 has a recess portion 54. As shown the light path, a light beam generated by the light source 52 is guided in the mushroom-shaped cone 50 and exits at the side edge with rather parallel light beam, which may be deflected by a prism into the forward direction at the peripheral region.

In the foregoing conventional designs of the illuminating apparatus, the output light is intended to be uniform in a large area or to have a rather parallel light beam.

SUMMARY OF THE INVENTION

The invention provides an illuminating apparatus, the illuminating apparatus emits light beam in an area with a pattern.

An embodiment of the invention provides an illuminating apparatus includes a plurality of light source units and a light guide plate. The light guide plate has a flat part and a protruding part, wherein the light source units are capable of providing a side light beam into the light guide plate at an edge surface. The side light beam is capable of being guided in the light guide plate and exiting at the protruding part.

Another embodiment of the invention also provides a flat illuminating apparatus. The flat illuminating apparatus includes a plurality of light source units and a light guide plate in a quadrangle shape. The light guide plate has a plurality of flat parts and a protruding line part joined between the flat parts. The light source units are capable of providing a side light beam into the light guide plate at an edge surface. The side light beam is capable of being guided in the light guide plate and exiting at the protruding line part.

Another embodiment of the invention also provides flat illuminating apparatus includes a plurality of light source units and a light guide plate in a disk-like shape. The light guide plate has a flat panel part and a protruding central part within the flat panel part. The light source units are capable of providing a side light beam into the light guide plate at an edge surface. The side light beam is capable of being guided in the light guide plate and exiting at the protruding central part.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In an embodiment of the invention, a novel illustrating apparatus is proposed. The illustrating apparatus is based on a light guide plate, and the light guide plate could collect a plurality of light source units into one location with more pleasant visual effect. The invention does not produce the monotone light source.

Figure 1:
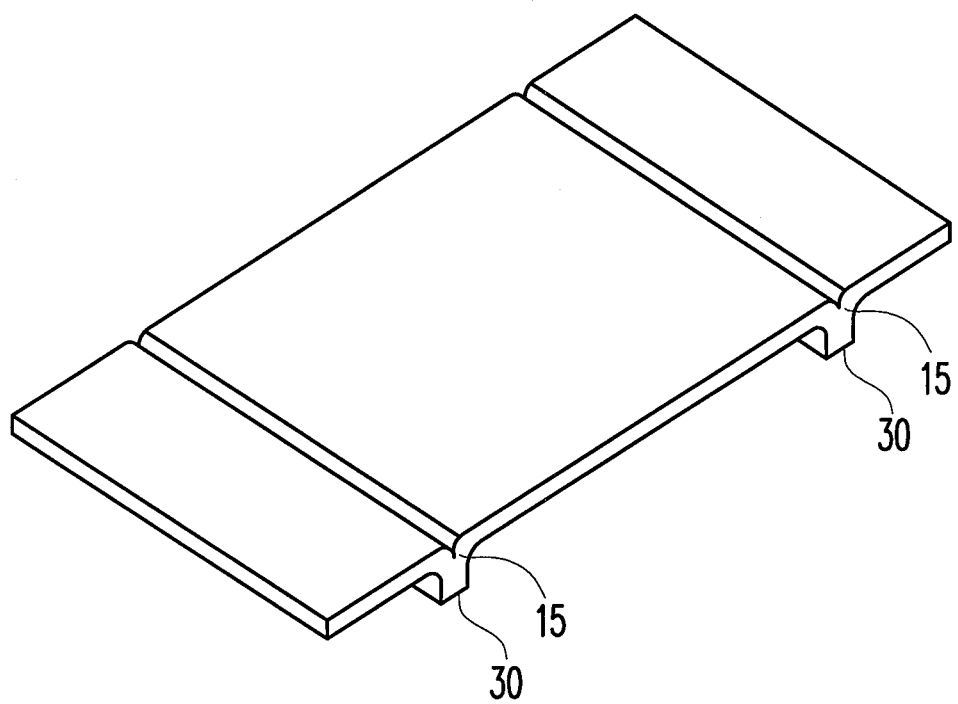
FIG. 1 is a drawing, schematically illustrating perspective view of a conventional back light module.
Figure 2:
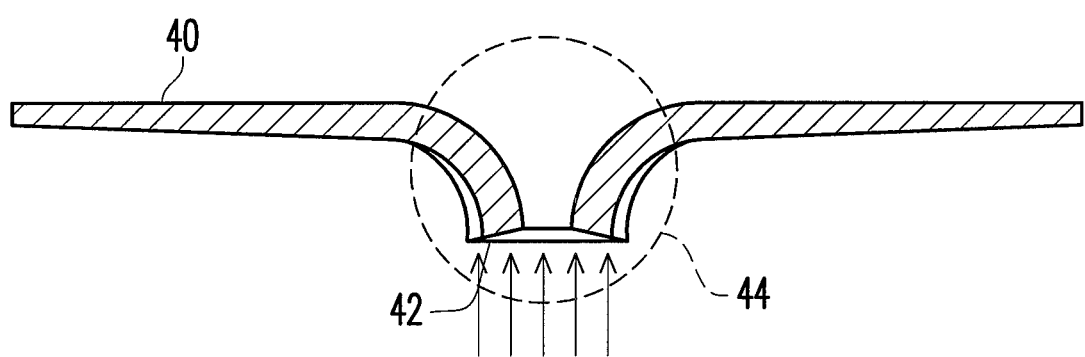
FIG. 2 is a drawing, schematically illustrating a cross-section view of a conventional illuminating apparatus.
Figure 3:
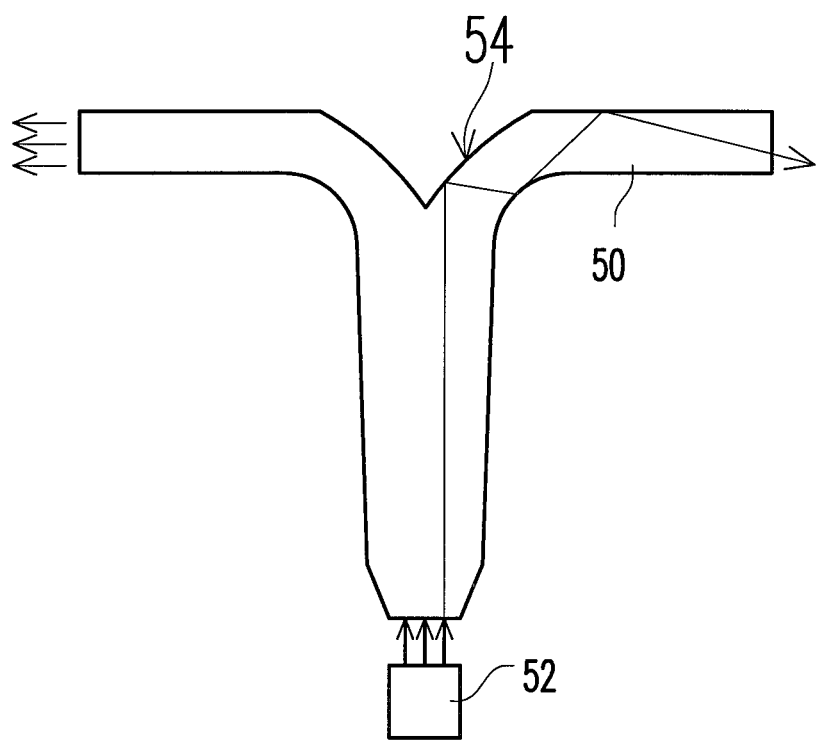
FIG. 3 is a drawing, schematically illustrating a cross-section view of a conventional illuminating apparatus.
Figure 4:
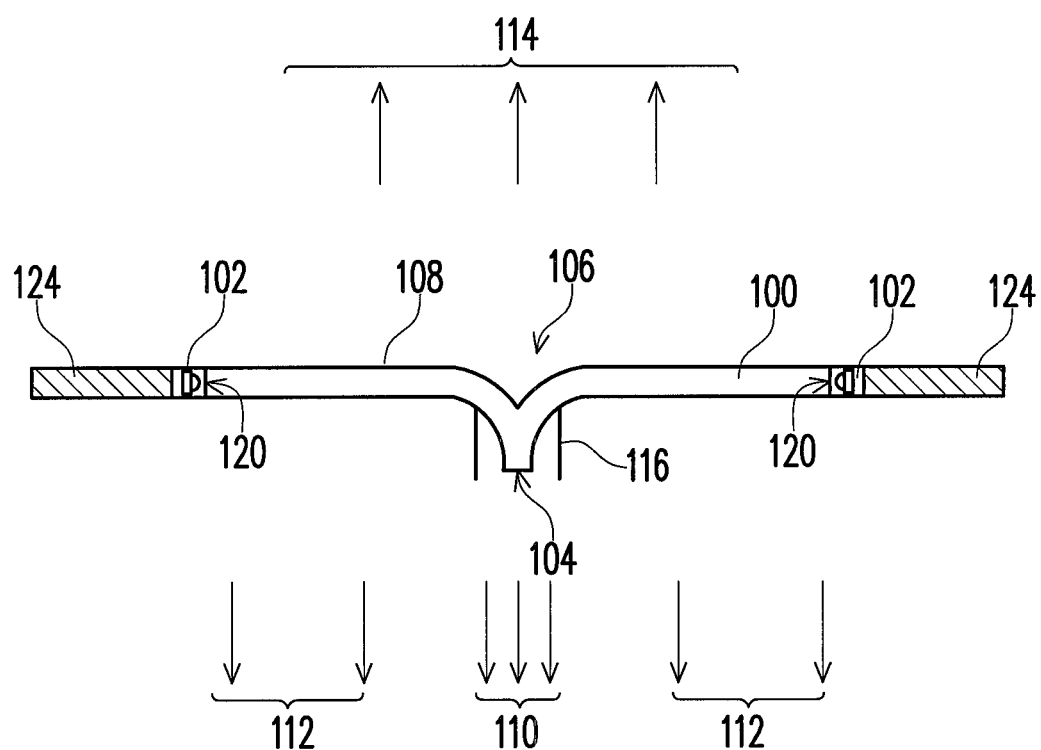
FIG. 4 is a cross-section view, schematically illustrating a structure of an illuminating apparatus, according to an embodiment of the invention.
Figure 5:
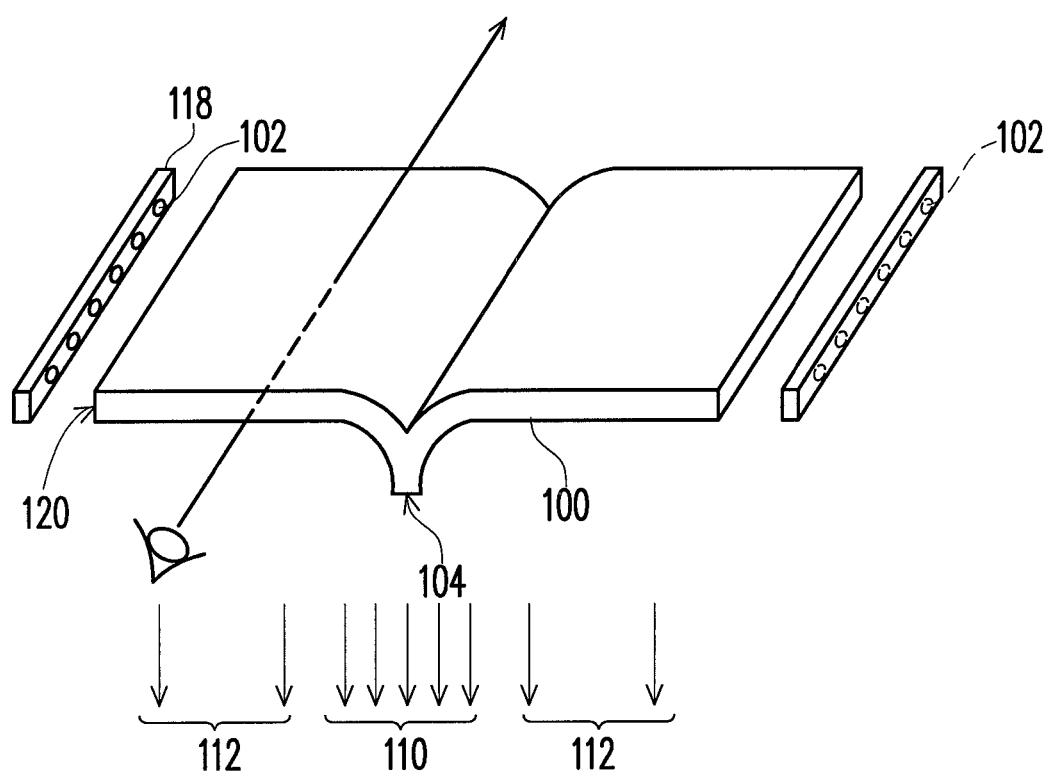
FIG. 5 is a perspective view, schematically illustrating a structure of an illuminating apparatus, according to an embodiment of the invention.

FIG. 4 is a cross-section view, schematically illustrating a structure of an illuminating apparatus, according to an embodiment of the invention. FIG. 5 is a perspective view, schematically illustrating a structure of an illuminating apparatus, according to an embodiment of the invention. Referring to FIG. 4 and FIG. 5, the illuminating apparatus includes a plurality of light source units 102 and a light guide plate 100. The light source units 102 may be the point light source, such as light emitting diode (LED). The light guide plate 100 may be divided into a flat part and a protruding part 106. The light source units 102 provide a side light beam into the light guide plate 100 at an edge surface 120. The side light beam is guided in the light guide plate 100 and exits at the protruding part 106 from the light outgoing surface 104. In addition, the light source units 102 may also be cooled by a cooling device 124 at the peripheral side.

In mechanism, the light beam generated by the light source units 102 are guided in the light guide plate 100 and exit from the light outgoing surface 104. If the protruding part 106 is a reduced area, then the light is concentrated, accordingly, so as to produce the light beam 110. However, a portion of the side light beam also exits from the flat part of the light guide plate 100, due to light leakage, for example. The light portion 112 and 114 may still exist. This light portion 112 and 114 also provide the minor illumination effect and may produce a better visual feeling. The whole light guide plate 100 is an illuminating body and has different light intensity.

In order to have more effect to confine the main light beam 110, a confining device 116 may also be implemented on the light guide plate 100, surrounding the protruding part 106. The portion 112 and 114 is for producing more visual effect in pleasant feeling while the light beam 110 is the main part to provide the illuminating source. In this consideration, an optical layer 108 may be formed on the surface of the light guide plate 100 for reducing light leakage by a certain level. In other words, the light portions 112 and 114 may still remain with lower intensity. The optical layer 108 may be on both sides or single side or even just a desired portion of the light guide plate 100, so as to produce the minor light portion to improve visual effect.

The optical layer 108 may be for example a dichromatic layer coated on the surface of the light guide plate 100. As a result, the flat part of the light guide plate 100 is semi-transparent at a range of viewing angle such as within 45 degrees from the normal direction. The eye may still look through the light guide plate 100 without fully blocked. Depending on actual need, a number of the light source units 102 are disposed on the base bar 118. The base bar 118 may be adhered to the light guide plate 100 at the edge surface 120, and the edge surface 120 is also the light incident surface. Further depending on the actual need, two base bars 118 are implemented at the both edges. However, other embodiment may be just one base bar 118.

Figure 6:
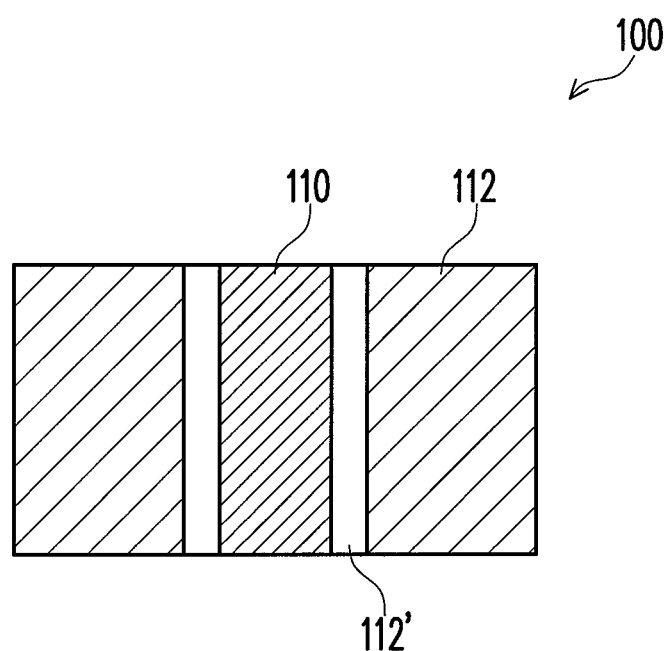
FIG. 6 is a top view, schematically illustrating a light intensity distribution, according to an embodiment of the invention.

FIG. 6 is a top view, schematically illustrating a light intensity distribution, according to an embodiment of the invention. In FIG. 6, the light out, with respect to the light intensity may be, for example, in two parts. The central part is from the light beam 110 as the main source for illumination. However, the flat parts at side are from the light portions 112 and/or the light portion 114 and provide a reduced illumination effect, which may also produce the decoration pattern with better feeling to the user, for example. In addition, it may also have the junction region 112' which is due to the confining device or a smooth transition region in light intensity.

In this embodiment, the rectangular shape is taken as the example. However, any quadrangle shape may be used. Even further, the disk-like shape may also be formed.

Figure 7:
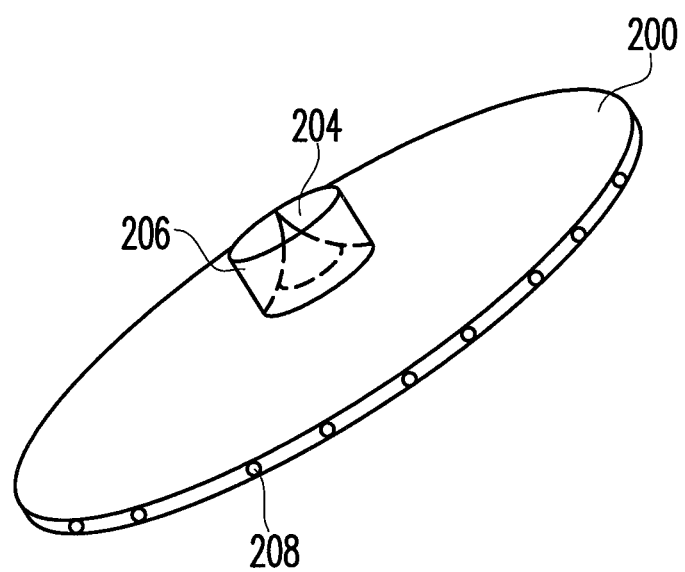
FIG. 7 is a perspective view, schematically illustrating a structure of an illuminating apparatus, according to an embodiment of the invention.
Figure 8:
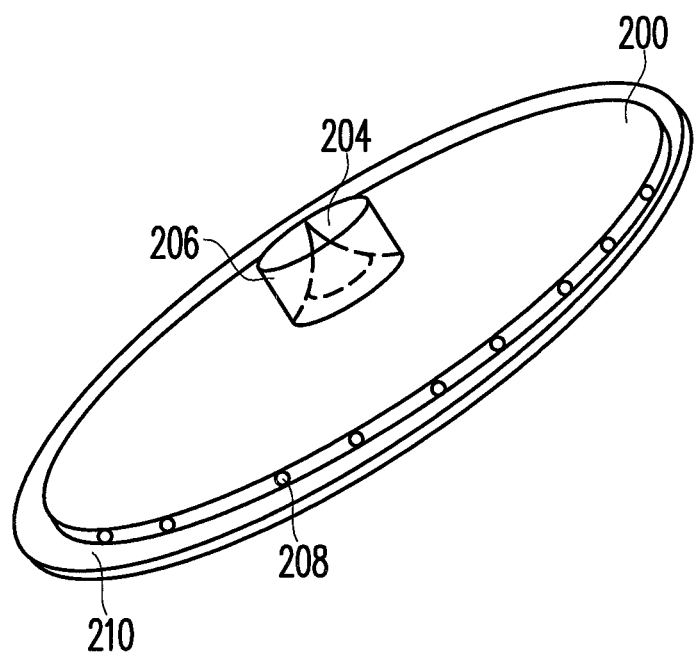
FIG. 8 is a perspective view, schematically illustrating a structure of an illuminating apparatus, according to an embodiment of the invention.

FIG. 7 is a perspective view, schematically illustrating a structure of an illuminating apparatus, according to an embodiment of the invention. In FIG. 7, with the same principle, the light guide plate 200 may be in disk shape, as an example. The protruding part 204 may be at the central region. The light source units 208 may be implemented at the peripheral edge. All the light beams from the light source units 208 are guided to the protruding part 204 for exiting. The confining device 206 may be a ring surrounding the protruding part 204. FIG. 8 is a perspective view, schematically illustrating a structure of an illuminating apparatus, according to an embodiment of the invention. In FIG. 8, the structure is similar to the structure in FIG. 7. However, the cooling ring 210 may be also included at the periphery for cooling the light source units 208. The cooling ring 210 may be for example a thermal dissipation material.

Figure 9:
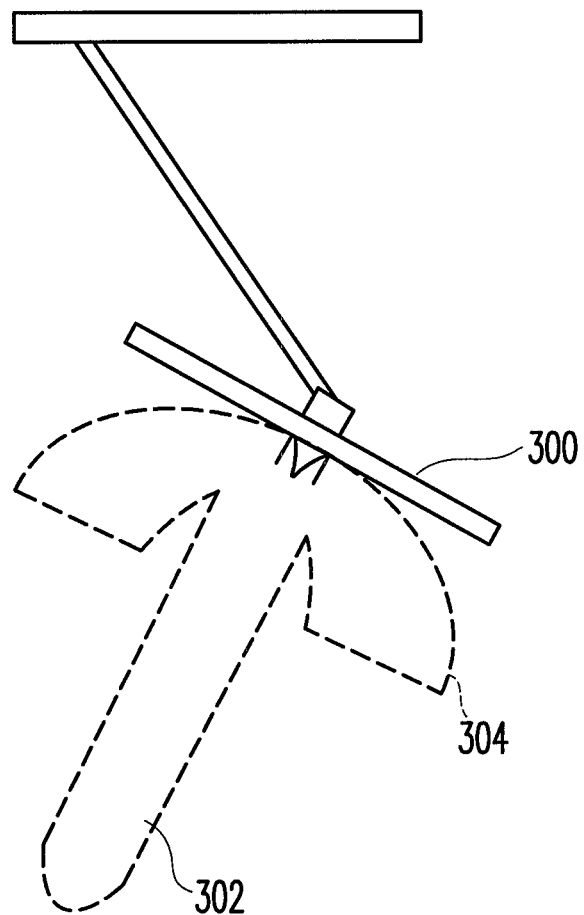
FIG. 9 is a cross-section view, schematically illustrating a structure of an illuminating apparatus with the light intensity profile, according to an embodiment of the invention.

FIG. 9 is a cross-section view, schematically illustrating a structure of an illuminating apparatus with the light intensity profile, according to an embodiment of the invention. In FIG. 9, for an application, the illuminating apparatus 300 is mounted on a wall by an arm. The light intensity profile includes two parts. The main light portion 302 is along the normal direction of the illuminating apparatus 300. However, the side light portion 304 is in less light intensity. The illuminating apparatus 300 is semi-transparent except the central region.

Figure 10A:
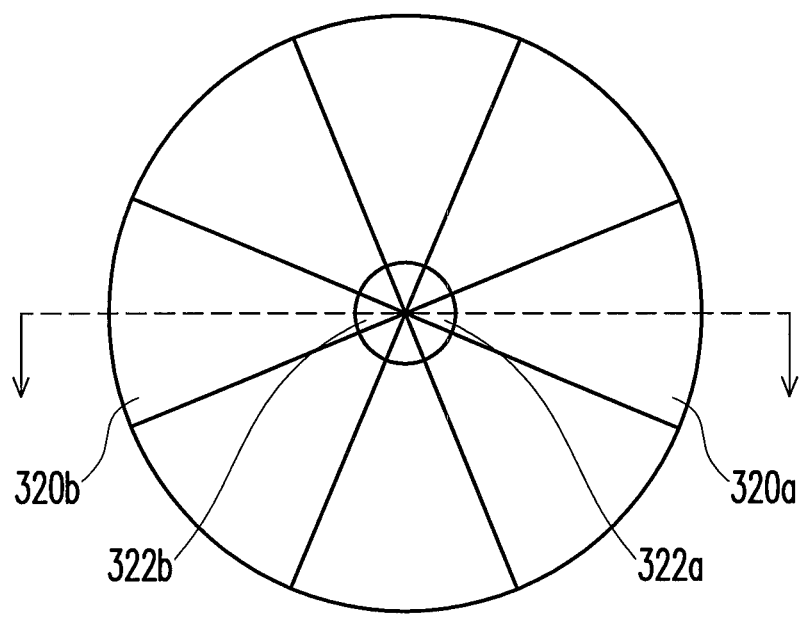
FIGS. 10A-10B are bottom and cross-section views, schematically illustrating a structure of an illuminating apparatus, according to an embodiment of the invention.
Figure 10B:
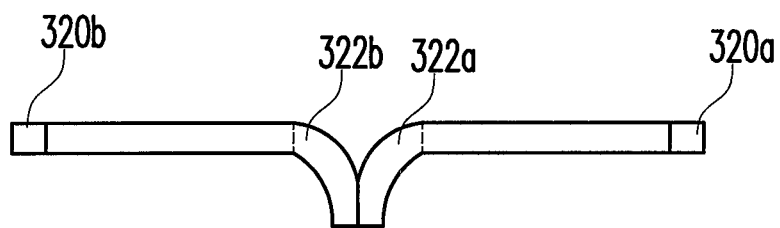

FIGS. 10A-10B are bottom and cross-section views, schematically illustrating a structure of an illuminating apparatus, according to an embodiment of the invention. In FIGS. 10A-10B, for the fabrication, the disk shape for the light guide plate may also be formed by assembled from several sectors, such as six sectors in this example. The sectors are symmetric in this example, as well. Taking the sector 320a and the sector 320b for description, the cross-section structure along the cutting line is shown in FIG. 10B. However, in FIG. 10B, the light source units are also shown at the edge surface. The protruding part 322a and 322b are also seen in FIG. 10B for more detail. In this manner, each sector may be form separately and assembled afterward. The fabrication may be easier in this manner. However, the principle in this example is still the same. The illumination effect may have slightly different but could still be about the same.

Figure 11:
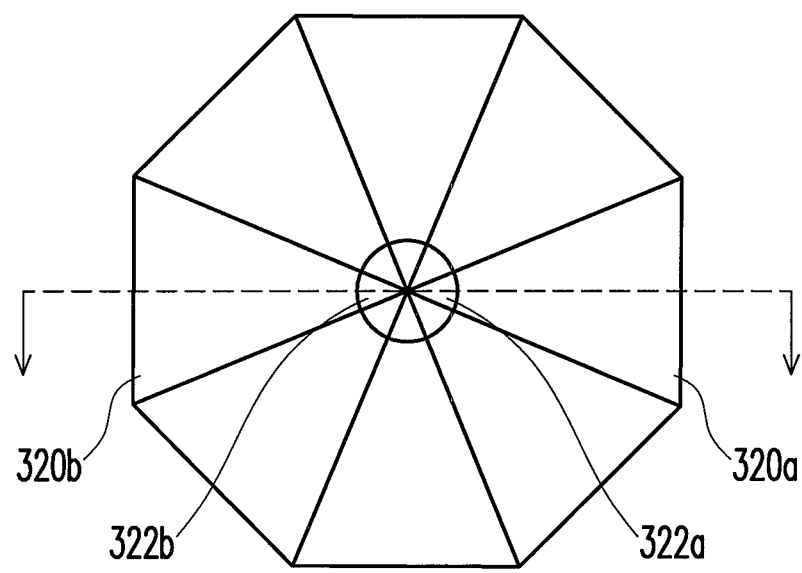
FIG. 11 is a bottom view, schematically illustrating a structure of an illuminating apparatus, according to an embodiment of the invention.

FIG. 11 is a bottom view, schematically illustrating a structure of an illuminating apparatus, according to an embodiment of the invention. In FIG. 11, similarly to FIG. 10A, the sectors may be changed into polygon sections. In this example, the polygon sections are in regular sections. The cross-section view at the cutting line may be the same as shown in FIG. 10B.

It is also noted that, the size of the sectors or polygon sections may be the same or different. It is depending on the actual need. In general, the embodiments may describe the features as follows.

The flat illuminating apparatus may include a plurality of light source units and a light guide plate in a quadrangle shape. The light guide plate has a plurality of flat parts and a protruding line part joined between the flat parts. The light source units provide a side light beam into the light guide plate at an edge surface. The side light beam is guided in the light guide plate and exits at the protruding line part.

Alternatively, the flat illuminating apparatus may include a plurality of light source units and a light guide plate in a disk-like shape. The light guide plate has a flat panel part and a protruding central part within the flat panel part. The light source units provide a side light beam into the light guide plate at an edge surface. The side light beam is guided in the light guide plate and exits at the protruding central part.

Figure 12:
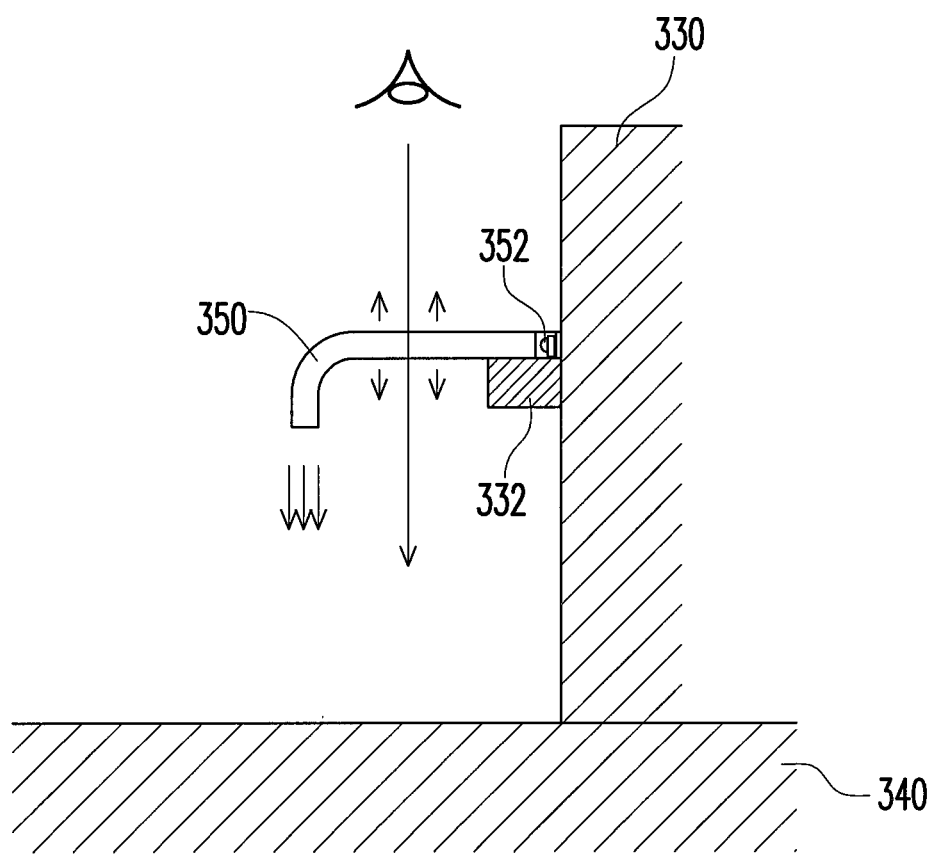
FIG. 12 is a drawing, schematically an application using the illuminating apparatus, according to an embodiment of the invention.

For the further applications, FIG. 12 is a drawing, schematically an application using the illuminating apparatus, according to an embodiment of the invention. In FIG. 12, as described in previous embodiments, the light guide plate 350 is a polygon shape, the section may be use independently. The edge with the light source units 352 may be fixed on a wall 330 by a fixing member 332. The flat part may emit a slight illumination. The main light portion is guided to the protruding part. As a result, the flat part may be like a table for holding objects. In addition, sine the flat part is semi-transparent, the light guide plate 350 does not totally block the visual direction. There is more possibility that some other object may be disposed on the ground under the light guide plate 350.

The embodiment of the invention with at least the features as described may have wide applications. The light output is not necessary to be uniform but more pleasant feeling, for example. In addition, the lights from the LEDs may be concentrated at the protruding par to produce higher brightness while the surrounding region may still have slight illumination. Even further, the illuminating apparatus may keep a certain level of transparency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illuminating apparatus, comprising:
   a plurality of light source units; and
   a light guide plate, having a flat part and a protruding part, wherein the flat part of the light guide plate is semi-transparent at a range of viewing angle only within 45 degrees from the normal direction of the light guide plate, the light source units are capable of providing a side light beam into the light guide plate at an edge surface, the side light beam is capable of being guided in the light guide plate and exiting at the protruding part.

2. The illuminating apparatus of claim 1, wherein a portion of the side light beam is also capable of exiting from the flat part of the light guide plate.

3. The illuminating apparatus of claim 1, further comprising an optical layer disposed on a surface of the light guide plate for reducing light leakage.

4. The illuminating apparatus of claim 1, further comprising a dichromatic layer coated on the surface of the light guide plate.

5. The illuminating apparatus of claim 1, further comprising a light confining element disposed on the light guide plate surrounding the protruding part for confining an output light beam.

6. A flat illuminating apparatus, comprising:
a plurality of light source units; and
a light guide plate in a quadrangle shape, having a plurality of flat parts and a protruding line part joined between the flat parts, wherein the flat parts of the light guide plate are semi-transparent at a range of viewing angle only within 45 degrees from the normal direction of the light guide plate, the light source units are capable of providing a side light beam into the light guide plate at an edge surface, the side light beam is capable of being guided in the light guide plate and exiting at the protruding line part.

7. The flat illuminating apparatus of claim 6, wherein a portion of the side light beam is also capable of exiting from the flat parts of the light guide plate.

8. The flat illuminating apparatus of claim 6, further comprising an optical layer disposed on a surface of the light guide plate for reducing light leakage.

9. The flat illuminating apparatus of claim 6, further comprising a dichromatic layer coated on the surface of the light guide plate.

10. The flat illuminating apparatus of claim 6, further comprising a light confining element disposed on the light guide plate surrounding the protruding line part for confining an output light beam.

* * * * *